(12) United States Patent
Shtivelman

(10) Patent No.: US 7,602,766 B2
(45) Date of Patent: *Oct. 13, 2009

(54) METHOD AND APPARATUS FOR AUTOMATIC NETWORK CONNECTION BETWEEN A SMALL BUSINESS AND A CLIENT

(75) Inventor: Yuri Shtivelman, Belmont, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 10/153,068

(22) Filed: May 20, 2002

(65) Prior Publication Data

US 2002/0136209 A1  Sep. 26, 2002

(51) Int. Cl.
*H04L 12/56* (2006.01)
(52) U.S. Cl. ..................................... 370/352
(58) Field of Classification Search ................ 370/352, 370/353, 354, 355, 356, 401; 379/210.01, 379/215.01
See application file for complete search history.

(56) References Cited

U.S. PATENT DOCUMENTS

| | | | | |
|---|---|---|---|---|
| 5,884,032 | A | * | 3/1999 | Bateman et al. ............. 709/204 |
| 6,144,667 | A | * | 11/2000 | Doshi et al. ................. 370/401 |
| 6,167,432 | A | * | 12/2000 | Jiang ........................... 709/204 |
| 6,324,264 | B1 | * | 11/2001 | Wiener et al. ............... 370/352 |
| 6,393,015 | B1 | | 5/2002 | Shtivelman |

* cited by examiner

Primary Examiner—Anh-Vu H Ly

(57) ABSTRACT

An Internet system for providing call-back services for a subscriber includes a web page having a call-back link to a subscription server; a call-back application operating on the subscription server and adapted for accepting input from a browsing person linked to the subscription server by the call-back link; and a call-switching system connected to and responsive to the call-back application on the subscription server. In this system the browsing person, upon activating the call-back link, is linked to the call back application on the subscription server and prompted for input including a call-back number, and the subscription server, after accepting the input, directs the call-switching system in establishing a telephony link between the subscriber and the browsing person. In some instances the telephony switch is part of a call-center with connected agents, and agents are assigned to represent selected subscribers. In this instance call-back connection is made between a browsing person and an agent. In some embodiments connections can be made either by conventional telephony links or by Internet telephone. In some instances as well provision is made for delivery of a full range of multi-media services from a subscriber to a browsing person.

11 Claims, 3 Drawing Sheets

METHOD AND APPARATUS FOR AUTOMATIC NETWORK CONNECTION BETWEEN A SMALL BUSINESS AND A CLIENT

FIELD OF THE INVENTION

The present invention is in the field of Internet network-communication systems and has particular application to methods and apparatus for the direct linking of an individual to a small business via automatic linking from a Web page.

BACKGROUND OF THE INVENTION

Continued development of hardware and software applications to aid in business advertisement, coupled with explosive growth of the global network called the Internet, has motivated small businesses to maintain at least one computer that is dedicated to the purpose of advertising that business's products and services on-line. There are, at the present time, many small businesses who are advertising their products and services on the Internet. Many such small ventures are very limited in capital and must be very cautious about where they invest their money, especially, when it comes to advertisement, and most utilize various services provided by second parties for founding and maintaining a WEB page, such as an Internet Service Provider.

Larger companies and corporations, having much larger budgets dedicated to advertising, use the Internet and their own on-premises networking-telephony equipment to set up their own interactive on-line environments. By clicking an icon on a Web page, a customer can become connected to a private company sales and service network, receive goods and services, pay via Internet-secure transfer applications, and so on. Often, these corporate giants provide multi-media files such as surround-video shows of products, on-line catalogs, audio/video files, and the like. Typically, a potential customer can download such files to his or her PC or watch them on the Web page via an external viewer designed for that purpose. In some cases, the customer can enter his or her phone number and ask for a scheduled or immediate callback.

As Web page advertising via the Internet is still under some scrutiny as to whether or not it is generally profitable, many of the larger businesses are taking a wait and see approach while keeping with a simpler form of Web page advertisement wherein a customer can click an icon and receive a call back or a mailing at a later date. Even for a large business with sufficient capital, setting up a telephony-network for providing multi-media media advertising is no casual undertaking. There are many variables to be considered when making such advertising decisions. One important consideration would be whether or not the market demographics of the target customer group would fit an Internet profile. For example, if the product or service can only be sold or performed locally, or within a certain geographical radius, it will not pay to invest in global exposure. If the target customer group is low in the percentage of persons having Internet access, it may not pay to advertise on-line. However, if the product or service is of a type as to be provided through mail order, or through some other criteria, appeals to a mass customer base, then setting up a private network system may be the way to go. As well, large companies feeling the pressure from like competitors who have their own networks are often drawn into the muti-media advertising game and set up similar networks so as not to be left behind.

There are at the time of this application many small companies which may include home-based businesses that offer products or services that appeal to mass customer groups. However, due to limited capital, these companies cannot afford to purchase sophisticated equipment such as file servers, routers, computers or other such apparatus that may be required to set up a private service network. A good many of these small organizations would love to grow beyond the infant stage and become major players in their fields, however, money constraints often severely limit the amount and quality of exposure that such a small business would receive through advertising. Typically, if these companies advertise on the Internet they may have only one Web page with a brief description of their products and services followed by an E-mail address and phone number where they can be reached. Interactive advertisements wherein multiple Web pages are maintained and network connections can be made, are generally reserved for businesses with more money to invest. The smaller organizations also typically turn to ISPs or other providers for maintaining a WEB page.

Through the growth of the Internet and the ability to network with other small businesses, many owners of small businesses have managed to obtain links on the Web pages of non-competitive business associates resulting in multiple links to their single Web page. While this may improve access to their particular Web page, it does not provide for the scope of sales and service capabilities afforded by a much larger corporation maintaining several Web pages and supporting a connectable service-network.

What is clearly needed is a method and apparatus whereby a small business, such as a home-based business, could have a direct network-connection with their potential clients wherein real-time interface and multi-media response to potential customers could be provided in a flexible manner and at a relatively low cost to the business owner. Such capability could be provided to the small business as a service by the Internet Service Provider (ISP) or by yet another party. In embodiments of the invention taught below, such a service is referred to as 'Green Pages'.

SUMMARY OF THE INVENTION

In a preferred embodiment of the present invention an Internet system for providing call-back services for a subscriber is provided, comprising a subscription call-back server adapted for accepting input from a browsing person linked to the call-back server; a web page having a jump link to the subscription call-back server; and a call-switching system connected to and responsive to the call-back server. In this system the browsing person, upon activating the WEB page jump link, is linked to the call-back server and prompted for input including a call-back number, and the call-back server, after accepting the input, directs the call-switching system in establishing a telephony link between the subscriber and the browsing person.

In a preferred embodiment the call-switching system comprises a telephony server (T-Server) connected to a telephony switch by a computer-telephony integration (CTI) link, and the T-Server is adapted to accept directions from the call-back server and to direct the telephony switch in establishing the telephony link between the subscriber and the browsing person. The call-back server in some aspects accepts one or both of a telephone number and an IP address or e-mail address from the browsing person, the telephony switch has an Internet-capable port, and the T-Server, in response to input from the call-back server establishes one or both of a telephone link and an Internet link between the subscriber and the browsing person. In some embodiments the system further comprises an IVR server connected to the telephony switch an adapted to provide IVR services over the connection provided by the call-switching system. Also in some the call-back server is adapted to accept instructions from a browsing person including a range of multi-media services.

In an alternative embodiment of the invention the system comprises a call-center operable through the telephony switch under control of the T-Server, the call-center comprising agent stations having each a personal computer with a video display unit (PC/VDU) connected on a Local Area Network (LAN) to the T-Server, and a telephone connected to the telephony switch, wherein the T-Server, in response to input from the call-back server is adapted to establish connections between browsing persons and connected agents, and to present data elicited from browsing persons on the VDUs at the agent stations.

In another aspect of the invention a subscription call-center is provided, comprising a telephony switch having a telephone trunk line connection to a public switched telephony network (PSTN); a plurality of agent stations connected to the telephony switch; and a CTI Server (T-Server) connected to the telephony switch by a CTI link, the T-Server having a digital link to an Internet-connected call-back server. The call-back server stores subscriber information and accepts input from browsing persons seeking connection to agents for the subscribers, and the call-back server, directed by a browsing person providing a call-back number, directs the T-Server to command the telephony switch to establish a telephony connection between the browsing person and an agent for the subscriber.

In some embodiments the subscription call-center further comprises a personal computer with a video display unit (PC/VDU) at each agent station, the PC/VDUs interconnected on a local area network (LAN) with the T-Server. In some of these embodiments the telephony switch has an Internet-capable port as well as a telephony trunk line, and the call-back server accepts IP addresses, e-mail addresses as well as telephone numbers from browsing persons, and the T-Server is adapted to cause the telephony switch to establish one or both of conventional telephony calls and Internet telephone calls between agents and browsing persons.

The embodiments of the invention, taught in further detail below, provide an ability for small businesses, such as home-based businesses, to flexibly provide for call-back services initiated from WEB page hits. Further, in some aspects, small businesses can now employ agents at a call-back call-center to represent their business interests, and enter into sales and commission agreements with the agents. Further, the subscribing small businesses can adjust their agent participation as need dictates. Detail of embodiments providing all of these features are taught below

BRIEF DESCRIPTION OF THE DRAWING FIGURES

DESCRIPTION OF THE PREFERRED EMBODIMENTS

Figure 1:
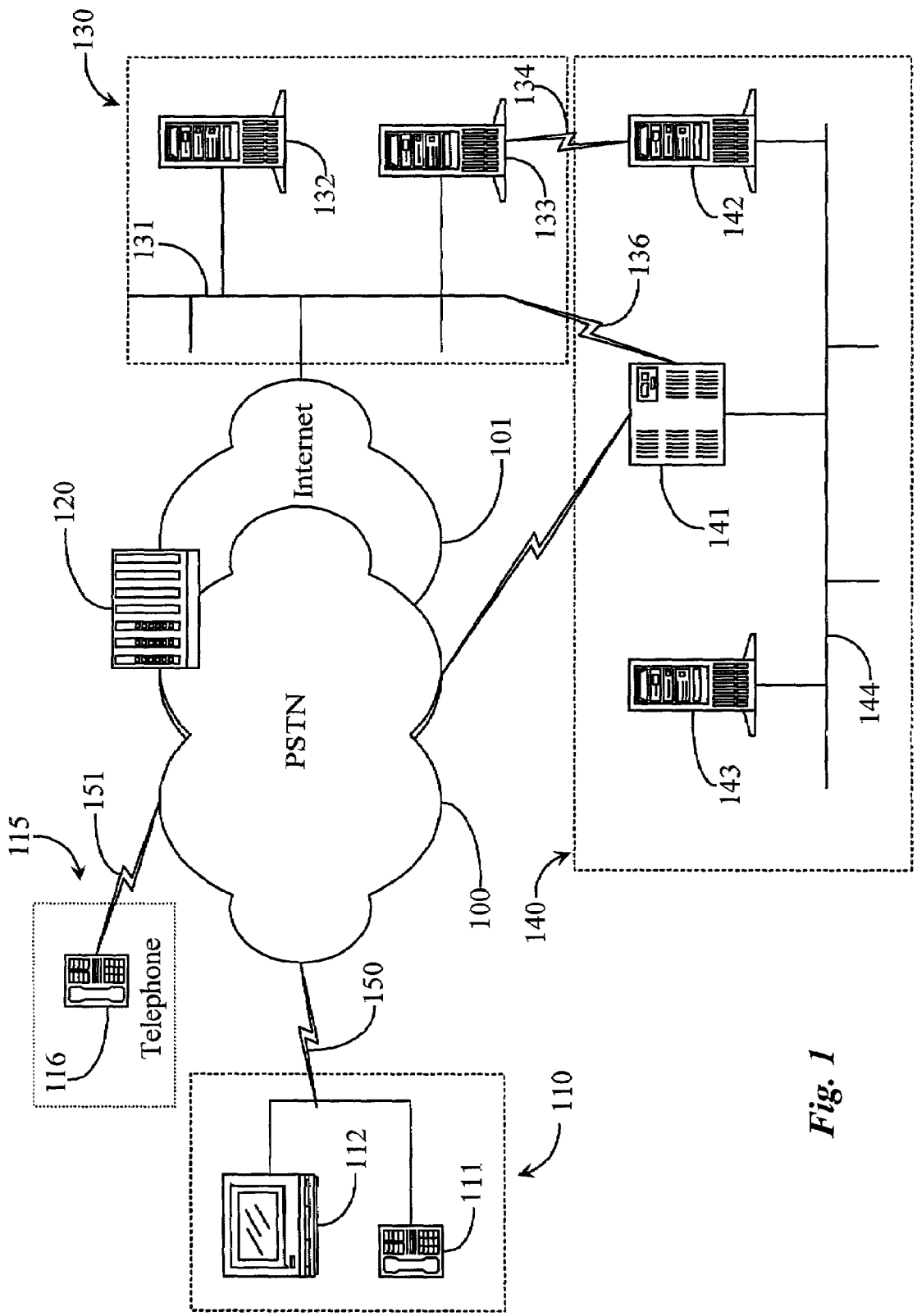
FIG. 1 is an simplified overview of a telephony-network system in accordance with an embodiment of the present invention.

FIG. 1 is a simplified overview of a telephony-network system in accordance with an embodiment of the present invention wherein a potential customer can have real-time on-line access to a small business advertising on the Internet. In a preferred embodiment of the present invention, a small business 115 having a WEB page hosted by a third party, such as his Internet Service Provider (ISP), would subscribe to a unique service that may be provided by his ISP or yet another provider. Through this service, a telephony-network system is made available to potential customers for the purpose of direct linking to small business 115 in real-time and with multi-media capabilities.

In FIG. 1, premises 110 represents any of potential customer's PC 112 and a telephone 111, which may be connected to the same telephone line as shown, or, alternatively, may have dedicated telephone lines. Telephone 111 for example, may have an analog line and PC 112 an ISDN line. PC 112 has the capability (equipment and software) of accessing the Internet by way of connection 150 to a Public Switched Telephone Network (PSTN) 100. Modem bank 120 represents the potential customer'ISP, which connects the potential customer's computer 112 to Internet domain 101. It will be clear to those with skill in the art that multiple potential customers will have different ISPs and so forth, but one such connection is sufficient to illustrate embodiments of the present invention.

As a potential customer browses Internet Web sites, he may come across the Web page of small business 115 which, in this embodiment, is located on a Web server 132, co-hosted by an ISP 130. It is not required that the small-business WEB page be provided by his/her ISP. It could reside anywhere in the Internet cloud that supports WEB pages. The ISP illustration is convenient. In various embodiments of the present invention, businesses subscribing to the unique Green Pages service of the present invention have a link incorporated in the WEB page to link browsing parties to a Green Pages server 133. The link can be in any of the forms known in the art for jumping from a WEB page to another Internet destination, such as clicking on an icon or text message. Typically, placing the cursor in the display on an active link area produces a change in the cursor, such as a pointing finger, indicating clicking a mouse button will activate a link (jump).

The Green Pages service may be provided, as shown, on a separate server at the small business' ISP, at another server elsewhere on the Internet, or may even be a part of the server that hosts the small business home page. It will be apparent to the skilled artisan that the residence of software and execution relative to platforms is somewhat arbitrary, and can be accomplished in a number of ways.

Once the potential customer is transferred to Green Pages server 133 in this particular embodiment, control routines on that server associate the potential customer with the small business whose WEB page the potential customer was viewing, and wherein the link was initiated. At server 133 the potential customer is presented with an input display, such as an inquiry form, to input specific information, such as the customer's telephone number, the type of connection desired, and so forth. For example, the customer may wish to speak with an agent immediately by telephone, but may not want to be E-mailed and so on. Other information, such as name, address, etc., may be required or optional.

Once the potential customer's input is made, which may be as simple as just a phone number, a submit input initiates action of the response system to the potential customer according to the instructions and data input. In this particular embodiment a link 134 is opened to a processor 142 executing a CTI application, termed by the inventors as a T-Server. Although in a stricter sense, the application is known as a T-Server, and may execute on various processors, it is simpler and more direct to refer to the platform and application together as the T-Server, which convention is followed below. T-Server 142 may be, as shown, a part of a separate hardware grouping 140, wherein T-Server 142 is linked by a CTI connection 144 to a telephony switch 141 and to an IVR server 143. Again, it will be apparent to the skilled artisan that T-Server 142, switch 141, and IVR 143 may be a part of a grouping as shown, may be hosted by ISP 120 or by any other interested party receiving compensation for maintaining the equipment. In one embodiment, equipment grouping 140 may be maintained by a telephone company which provides the service for a small charge on the small business' telephone bill. There are many other ways the functionality taught herein may be implemented.

Referring back to FIG. 1, T-Server 142 in an embodiment of the present invention has a connection 144 to a telephony switch 141 for the purpose of initiating calls to small businesses such as small business 115 and to potential customers requesting a telephone connection. As is known in the art, CTI servers may monitor and control operations of telephony switches by CTI link within the range of functionality provided by individual such telephony switches. T-Server 142, following instructions from server 133, initiates and completes these connections. For example, T-Server 142 may control switch 141 to initiate a call through PSTN 100 to telephone 116 at small business 115 and to the potential customer's premises 110 to telephone 112, and then, upon establishing the two calls, connect them, completing the link from the customer to the small business.

Small business 115 and the customer at premises 110 can be linked via telephone and in other ways as well. For example, also linked to telephony switch via line 144 is an IVR server 143 where additional applications may be stored such as voice mail, E-mail, Automatic Fax messages, etc. For example, if the customer has input instructions to Green Pages server 133 indicating a preference to receive information by fax, then IVR server 143 would be accessed and the customer could be sent pre-stored information by facsimile.

In yet another embodiment, IVR server 143 can be used to provide a front end to the small business owner by giving him/her options for treating the communications request. For example, the business owner might choose to accept the call, to reject a call, to schedule a callback, or to ask the customer to leave a message or send an email.

If switch 141 has a TCP/IP connection capability and link 136, as in the present example, one option for the potential customer is to be connected by Internet phone. In this instance the potential customer will have provided an IP address. Switch 141 may then establish a connection to the potential customer via link 136 through ISP 130. Instant communication could be established for customers indicating a preference for Internet-capable telephones, as described above. Similarly, there are certain WEB applications and or plug-ins to WEB browsers capable of transferring files in instant fashion that are known in the art and could be incorporated by a small business to send files to a customer having a compatible application. These mediums for communication are known in the art and could be incorporated into the service and installed on a PC located at a small business. All that would be required of the customer is that he have the matching or compatible type of communication program installed on PC 112.

Link server 133, as previously described, would list the communication programs available to the customer and offer a choice of preferred methods. It will be apparent to one with skill in the art that each server in the network of FIG. 1 is not required to perform only one dedicated function such as severs 132, 133, and 142 of FIG. 1, but can be set up to perform multi-functions such as storing customer histories or providing statistics related to success of the service provided, etc. Similarly, separate servers 132, 133, and 142 may be of the form of one server capable of storing and providing all the necessary information and software to enable the desired network connection. However, in this instant embodiment, the inventor has chosen to represent the server function of the present invention with separate servers for the purpose of clarity with regards to describing sever function.

The embodiment represented in FIG. 1 is unique partly by virtue of the fact that customers can be given the choice of several different real-time multimedia-communication methods that are known in the art and made available in the form of software applications stored on a server connected to a PC, or on a PC installed at a small business such as small business 115 that is made accessible to the customer via automatic-linking methods and software. Upon filling out a form and submitting the information, as described above, an online environment in the form of a sales/service network is made available to the small business for a reasonable monthly subscription.

In one embodiment, a small business wishing to offer the customer a wide variety of communication options as well as multimedia files for download may invest in a file server for the purpose of storing such files and applications. A sever such as this could be installed at the small business location and connected to a PC also installed at the small business and dedicated to interaction with customers requesting such information and communication.

In the embodiment of the invention above-described, a small business, such as a home business with very limited personnel and equipment resources, can have call-back service through a WEB page much as is provided by large companies through their own equipment platforms. There are, however some potential limitations in the above-described embodiments of the invention. For example, the WEB advertising and call-back service provided may well be successful enough to create a significant call load for a small business. For a truly small business, such as a one or two-person home business, a manpower shortage could quickly appear, there being more call-back business than the limited personnel can handle. Further, many people WEB browsing are doing so in evening and weekend hours. This may place an additional burden on a small business.

In recognition of the above possible difficulties, in an alternate embodiment of the present invention, an agent call-center is provided wherein independent sales agents represent subscriber businesses, and are trained as to the specific products and services offered by each business. This rent-an-agent call center can be implemented in a number of ways, and in a preferred embodiment is implemented as a part of equipment group 140 of FIG. 1. In this embodiment, the purpose of having a call-center is that many small businesses do not have the manpower to handle multiple-live calls that may result from many potential customers browsing their pages and attempting to link. As well, many customers are browsing for products or services after normal business hours such as from 6 PM on during the week, or perhaps, on a Sunday. The advantage here is that "the store is always open, and someone is there to help you".

Figure 2:
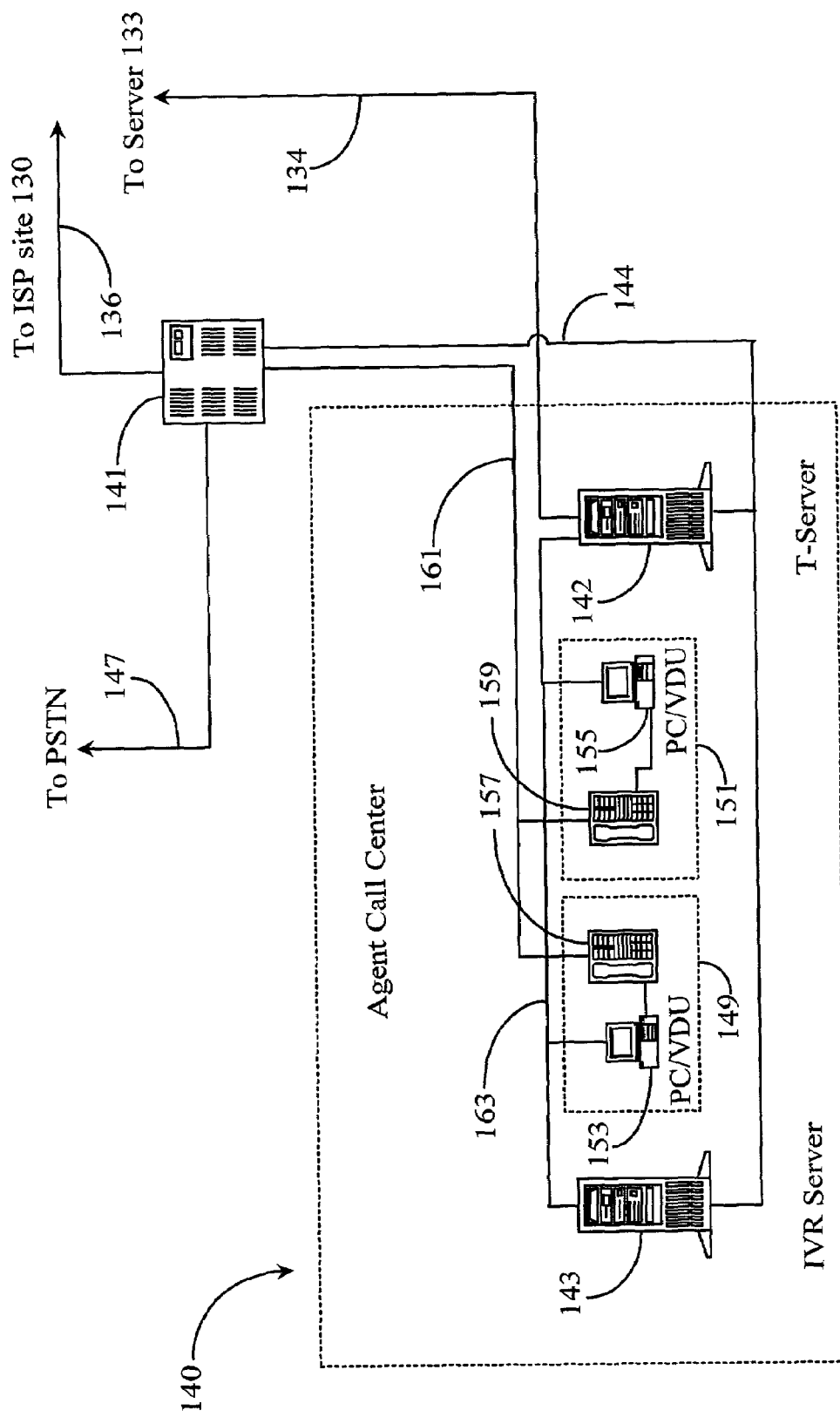
FIG. 2 is a simplified overview of a call center in accordance with an alternative embodiment of the present invention.

FIG. 2 is a diagram of an agent call-center in an alternative embodiment of the present invention wherein the telephony-network of FIG. 1 is enhanced with a live callcenter comprising specially trained agents and associated equipment, including software, to be operated and maintained by a hosting organization, such as an ISP, perhaps the ISP of the small business and providing the Green Pages service. There may be a large number of small businesses subscribing to the service above-described wherein the unique telephony-network of FIG. 1 is provided.

Referring now to FIG. 2, agent station 149 and agent station 151 are part of equipment grouping 140 that now functions as a call center in this instant embodiment of the present invention. Of course the call center might be anywhere in the network, and calls might be forwarded to one or more call center in fashion well-known to the inventor. Agent station 149 has a PC with a video display unit (PC/VDU) 153 as well as a telephone 157. Similarly, agent station 151 has a PC/VDU 155 and telephone 159. Telephones 157 and 159 are linked to telephony switch 141 via line 161 and to their associated PC/VDU's. PC/VDU's 153 and 155 are interconnected on a Local Are Network (LAN) 163 which also connects to IVR server 143 and to T-Server 142. The other connection shown are those previously described with reference to FIG. 1.

It will be apparent to one with skill in the art that there could be many more than the two agent stations shown, however two are shown in this instant embodiment and are deemed sufficient by the inventor to adequately describe the invention. In this instant embodiment, IVR server 143, as well as T-server 142 contain instances of a unique interactive-routing software designed to enable agents to process and dispose of incoming data and instructions from Green Pages server 133.

In this embodiment, when a potential customer connects to Green Pages server 133 and inputs data and requests, server 133 via link 134 activates routines in T-Server 142. Now, instead of placing a call to the small business and the potential customer, then connecting the two calls, the T-Server forwards the customer input data to an agent listed as serving the particular small business, calls the potential customer, and connects the potential customer with the agent selected.

There are, as will be apparent to the skilled artisan, many ways the information sent may be displayed to an agent, such as in the form of icons to be displayed on PC/VDU's 149 and 151. For example, after requested methods for communication to a particular business are chosen by a potential customer on the associated inquiry form in link server 133 of FIG. 1, completed inquiry forms may be routed to a particular agent station assigned to the small business that has been selected by the customer, such as agent station 149. This information includes the method of communication chosen by the customer along with the small business information associated with it such as a locator number for the business in a roster of the agent receiving the information, requested time for a connection, additional information such as the specific type of product the customer is interested in, and so on. In a case such as this, where a real-time telephone connection has not been requested, the agent at agent station 149 could re-route the customer to IVR server 143 where the customer could leave voice mail, download product information, or receive an instant fax, etc. In alternative embodiments routing may be directly to server 143 or similar server, and operation would be more automatic, as already described in previous embodiments above.

As described in the previous paragraph, incoming data from link server 133 of FIG. 1 is routed to the particular agent with that business on his roster. For example, an inquiry form requesting immediate telephone access to small business 115 of FIG. 1 has been routed to agent station 151 in the form of an icon indicating an incoming telephone call. Switch 141 has made telephone contact with the customer and is queuing the customer until the agent at station 151 picks up the call. Once connected via phone, the agent may direct the customer to further services or take an order, etc. Connections to IVR server 143 can also be initiated by the agent. Multimedia files and other information requested by a customer is sent via line 144 through telephony switch 141 and through link 136 to the customers PC such as PC 112 of FIG. 1. As described above, applications that are interactive such as video, audio and the like can be sent with the agent helping the customer to pick the appropriate file type etc. Furthermore, Internet telephone applications could be initiated with the customer and agent saving toll charges and so on. Similarly, there are Internet file transfer programs available whereby the customer could be sent files by an agent using the same program in an almost instant fashion. On-line secure payment methods may also be utilized in this environment.

It will be apparent to those with skill in the art that other routes could be utilized for the purposes of transferring data from the agent call-center to the customer other than the one described in the above paragraph with reference to multimedia files. One possible route is through line 144, telephony switch 141, through line 136 and back via Internet domain 101 of FIG. 1. There are typically many such routes available in an Internet-connected telephony network. Similarly, subscriber businesses may be located state-wide, nation-wide, or world-wide depending upon the intent of the service provider that offers the service An agent operating in an enhanced telephony-network such as the one described in this instant embodiment could perhaps derive a small commission from any sales orders made in this manner to be payable by the particular business associated with that particular sale. If no sales are made, no commission is due. The monthly amount paid to the service provider in this case supports the basic service, and may even provide a base salary for such agents. Commission sales representatives are known in the art and can obtain licenses to represent numerous companies from a separate location. In this instant embodiment, particulars such as commission structures and the like are worked out by the participating parties.

The embodiment represented in FIG. 2 is unique partly by virtue of the fact that customers can be given the choice of several different real-time multimedia-communication methods that are known in the art and made available in the form of software applications on a server that is made accessible to the customer via automatic linking methods. Further, in the same embodiment, connection can also be made to a live agent utilizing a unique application adapted to enhance the disposition of incoming requests in an environment that is a functioning on-line telephony-network and is made available to a small business for a reasonable monthly subscription.

As this instant embodiment with reference to FIG. 2 is meant to enhance the previously described embodiments of FIG. 1, it will be apparent to one with skill in the art that while a call-center such as the one described herein may be present and operating in the network, it is not required to be operating at all times. There are many configurations and schemes that could be employed in a network that is enhanced by such a call-center. For example, a small business could be given the choice of the extra service provided by the call-center, and be charged appropriately for the service. In another embodiment, the call-center could become operative only after normal business hours, or at times when businesses are normally closed such as weekends, etc. In still another embodiment a call-enter enhancement may be offered to those businesses that cannot handle the volume of inquiries such as might be the case with a home-based business wherein only a few individuals are present at any given time. There are many such configurations possible, many of which have already been described.

Another feature and advantage of the call-center embodiments described herein is that the service is flexible for changing needs. Many small business subscribers will not initially need the call-center enhancement. As business grows a business may need to add the call-center enhancement with a single agent, even part-time. As business grows further, more agent service may be incrementally added. If business slacks off at certain times or seasons, agent use can be curtailed appropriately.

Figure 3:
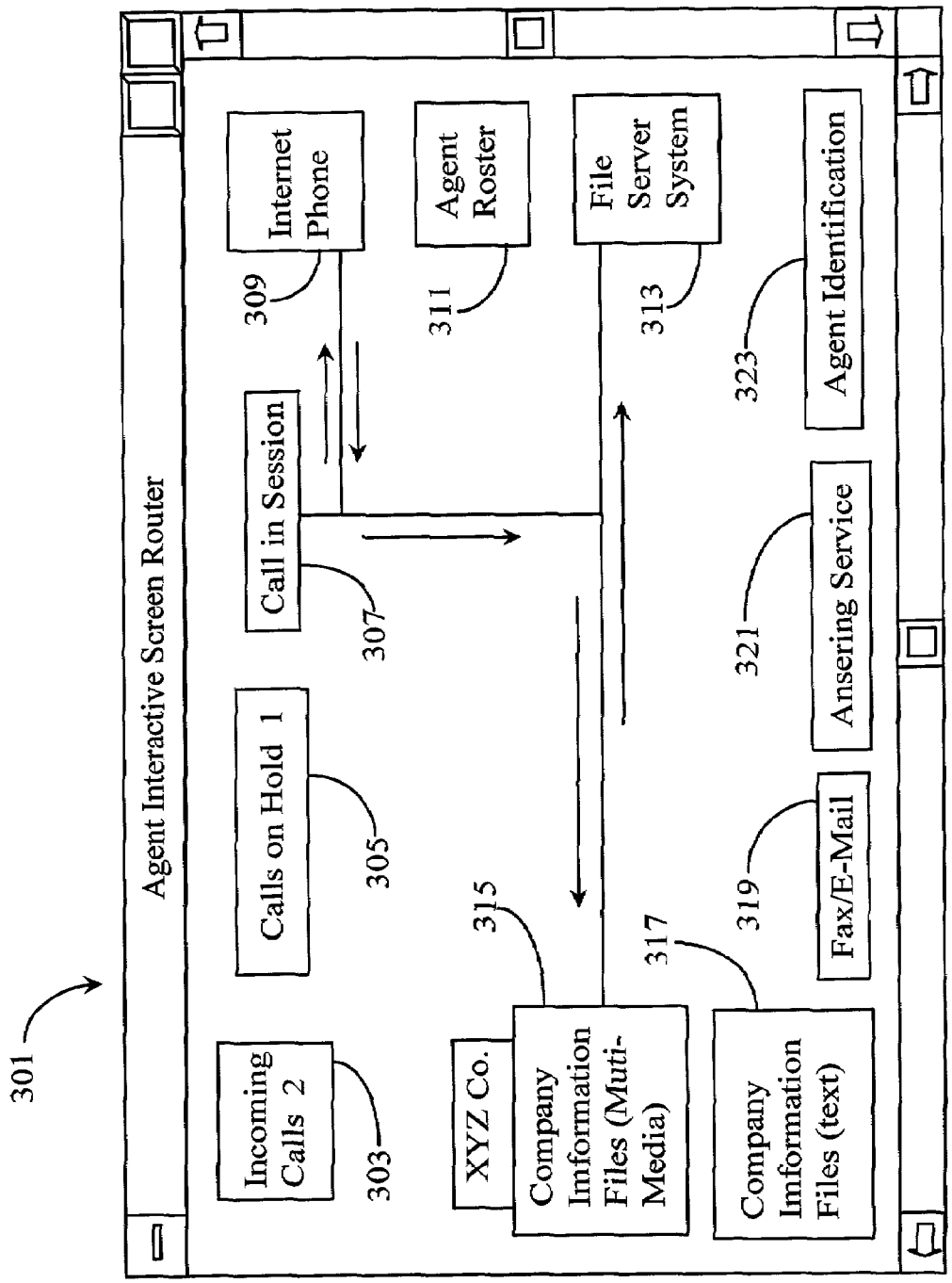
FIG. 3 is an illustrative view of interactive-routing software as used in accordance with the embodiment shown in FIG. 2.

FIG. 3 is an example of an interactive display provided by routing software as it is used in accordance with the call-center-enhanced embodiment of the present invention described with reference and illustration in FIG. 2, wherein a scrollable interactive window display 301 is present on a PC/VDU such as PC/VDU 153 in agent station 149 of FIG. 2. Various selectable icons represent different applications that may be manipulated by an agent to dispose of an incoming request. For example, incoming calls are represented by an icon 303 which further indicates that there are 2 such calls in a waiting queue. An icon 305 represents a call that has been put on hold by the agent after it was answered. Icon 307 is a call in session whereby the agent is engaged in servicing the customer. Icons representing incoming calls have, in this embodiment, come from link server 133 as customers requesting immediate telephone connection. Requests for communication other than by telephone such as leaving voicemail, obtaining downloadable files and so on are represented by other icons (not shown) depicting the type of communication desired. This incoming data can be re-routed to IVR server 143 of FIG. 2, or in some embodiments, may by-pass the agent altogether.

Icon 309 represents an instance of an Internet-capable phone application installed either on IVR server 143 of FIG. 2 and accessible to the agent, or on PC/VDU 153 whereby a customer can elect to be phoned back without toll charges provided the customer has the required software installed on PC 112 of FIG. 1. An agent roster 311 is a list of all of the small businesses that are represented by this particular agent. By clicking on agent roster 311, the agent opens the list of small businesses and can then click on the appropriate business that the customer is requesting information about. After clicking on agent roster 311, associated information files are opened and displayed in window 301 such as an icon 315 representing the stored multimedia files for download, and an icon 317 representing text information for download. These files could be sent to the customer a number of ways. For example, a file server system represented by an icon 313 could be utilized by the agent to link the customer having the same application or compatible application for the purposes of downloading the files in expedient fashion. These programs are faster than E-mail and often faster than a download from a standard Web page. As well, many of these programs can operate simultaneously while the customer is still browsing the Internet or working on a document, while at the same time, using an Internet-capable phone and downloading files with a file-server application. Icons 319 and 321 represent standard communication options. Icon 323 represents agent identification and can be used to tag sales orders and the like.

It will be apparent to those with skill in the art that the configuration of an interactive-routing software as described above can be accomplished in a number of ways. The interface, for example, may be a Graphic User Interface (GUI) wherein icons may be used to represent calls, applications, and other incoming requests, and the individual agent at one agent station may select to display icons as desired and as shown in FIG. 3. In an alternative embodiment an incoming request may appear on an agent's PC/VDU as a text block with the text indicating the nature of the incoming request. In this instance programmable language could be used to further dispose of requests. It will further be apparent to one with skill in the art that features such as drag and drop capabilities could be incorporated in the software and utilized by agents to initiate certain actions such as connecting a customer to IDN server 143 of FIG. 2, or perhaps dropping a file onto the customers name in the file server system 313 for transfer and so on.

It will be apparent to one with skill in the art that there could be many different hardware and software configurations present in a telephony-network such as the one described in the various embodiments above without departing from the spirit and scope of the present invention. For example, other servers could be present along with additional processors running conventional routing software designed to route information at locations other than in portions of the network that may be maintained by an ISP or other interested party. The hosting service provider may have sharing arrangements with other networks already in place and may make minor alterations to tailor the specific network to meet it's intended service objectives such as adding servers, installing firewalls and so on. There are many different possibilities, many of which have already been described above. The invention is limited only by the claims which follow.

One of the options described above is that a potential customer may prefer to be contacted by Internet phone, and would provide an IP address. It should therefore be apparent to the skilled artisan that there are options available in practicing the invention in use of conventional intelligent network telephony or Internet (or Intranet) telephony for various calls to be placed. The invention is not limited to one type of telephony system or service.

What is claimed is:

1. An Internet system for providing call-back services, comprising:
    a call-back server;
    a web page having a link to the call-back server; and
    an IP telephony call-switching system responsive to the call-back server;
    wherein a person, upon activating the link, is linked to the call-back server and the call-back server determines an IP address for the person from connection activity initiated by the person and the call-back server, after determining the IP address, directs the call-switching system in establishing an IP telephony link between a subscriber and the person.

2. The system of claim 1 wherein the call-switching system comprises an IP telephony server (I-Server), and the I-Server is adapted to accept directions from the call-back server to establish the IP telephony link between the subscriber and the person.

3. The system of claim 2 further comprising an Integrated Voice Response (IVR) server connected to the IP call switching system and adapted to provide IVR services over the IP telephony link provided by the call-switching system.

4. The system of claim 1 wherein the call-back server is adapted to accept instructions from the person including a range of multi-media services.

5. The system of claim 3 wherein the IVR server is adapted to provide to the subscriber a range of call disposition options.

6. The system of claim 2 further comprising a call-center operable through the IP call switching system under control of the IP telephony server, the call-center comprising agent stations having each a personal computer with a video display unit (PC/VDU) connected on a Local Area Network (LAN) to the IP telephony server, wherein the IP telephony server, in response to input from the call-back server is adapted to establish connections between the persons and connected agents, and to present data elicited from the persons on the VDUs at the agent stations.

7. A call-center, comprising:

a call-back server operating an IP telephony call-switching system having an Internet link;

a plurality of agent stations connected to the call switching system;

wherein the call-back server accesses locally stored subscriber information and accepts input from persons seeking connection to agents for the subscribers, and the call-back server determines an IP address for a person from connection activity initiated by the person, and, upon activating a web-page link, directs the call-switching system to establish an IP telephony connection between the persons and an agent.

8. The call-center of claim 7 further comprising a personal computer with a video display unit (PC/VDU) at each agent station, the PC/VDUs interconnected on a local area network (LAN) with the call-back server.

9. A method for providing call-back services to a person on Internet, comprising steps of:

(a) providing a link in a WEB page to a call-back server;

(b) providing a mechanism for the call back server to accept and determine an IP address for the person upon activating the link;

(c) operating an IP-telephony call switching system by the call-back server to establish an IP telephony connection between the person and a third party.

10. The method of claim 9 wherein in step (b) the mechanism is enabled to elicit preferences from the person for a range of available multi-media services associated with the third party.

11. The method of claim 9 wherein the IP telephony call-switching system has connected agent stations, and in step (c) the IP telephony connection is established between the person and an agent associated with the third party.

* * * * *

UNITED STATES PATENT AND TRADEMARK OFFICE
CERTIFICATE OF CORRECTION

PATENT NO.      : 7,602,766 B2
APPLICATION NO. : 10/153068
DATED           : October 13, 2009
INVENTOR(S)     : Yuri Shtivelman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,602,766 B2 |
| APPLICATION NO. | : 10/153068 |
| DATED | : October 13, 2009 |
| INVENTOR(S) | : Yuri Shtivelman |

Page 1 of 1

It is certified that error appears in the above-identified patent and that said Letters Patent is hereby corrected as shown below:

On the Title Page:

Insert item (65) Related Application Data as follows:

-- Related U.S. Application Data

(65) Continuation of Application No. 08/928,744, filed September 12, 1997, now U.S. Patent No. 6,393,015. --

In the Specification:

Below the title insert the CROSS-REFERENCE TO RELATED APPLICATION as follows:

-- CROSS-REFERENCE TO RELATED APPLICATION

The present application is a continuation of Application No. 08/928,744, filed September 12, 1997, now U.S. Patent No. 6,393,015. --

Signed and Sealed this
Third Day of June, 2014

Michelle K. Lee
*Deputy Director of the United States Patent and Trademark Office*